UNITED STATES PATENT OFFICE.

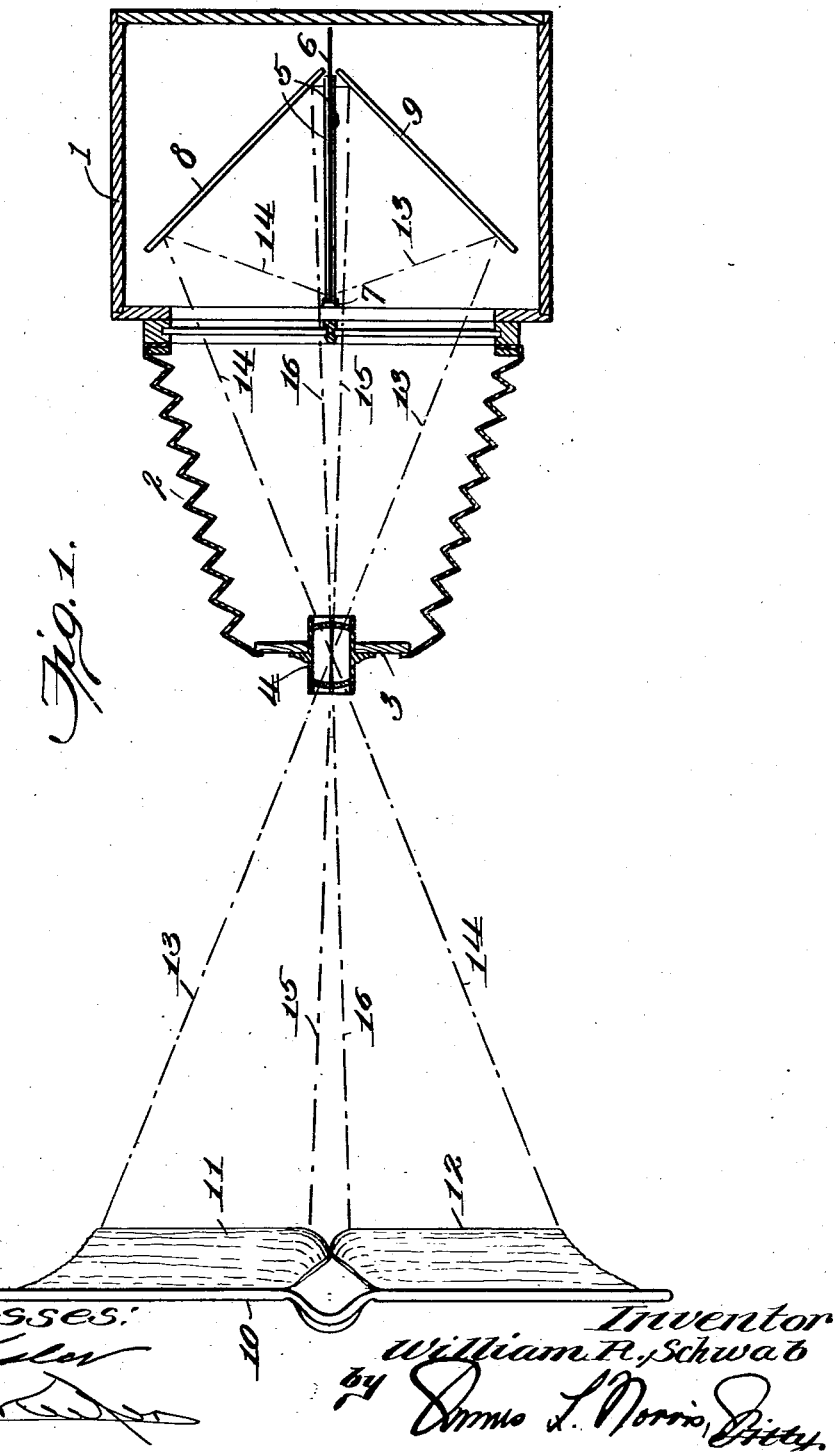

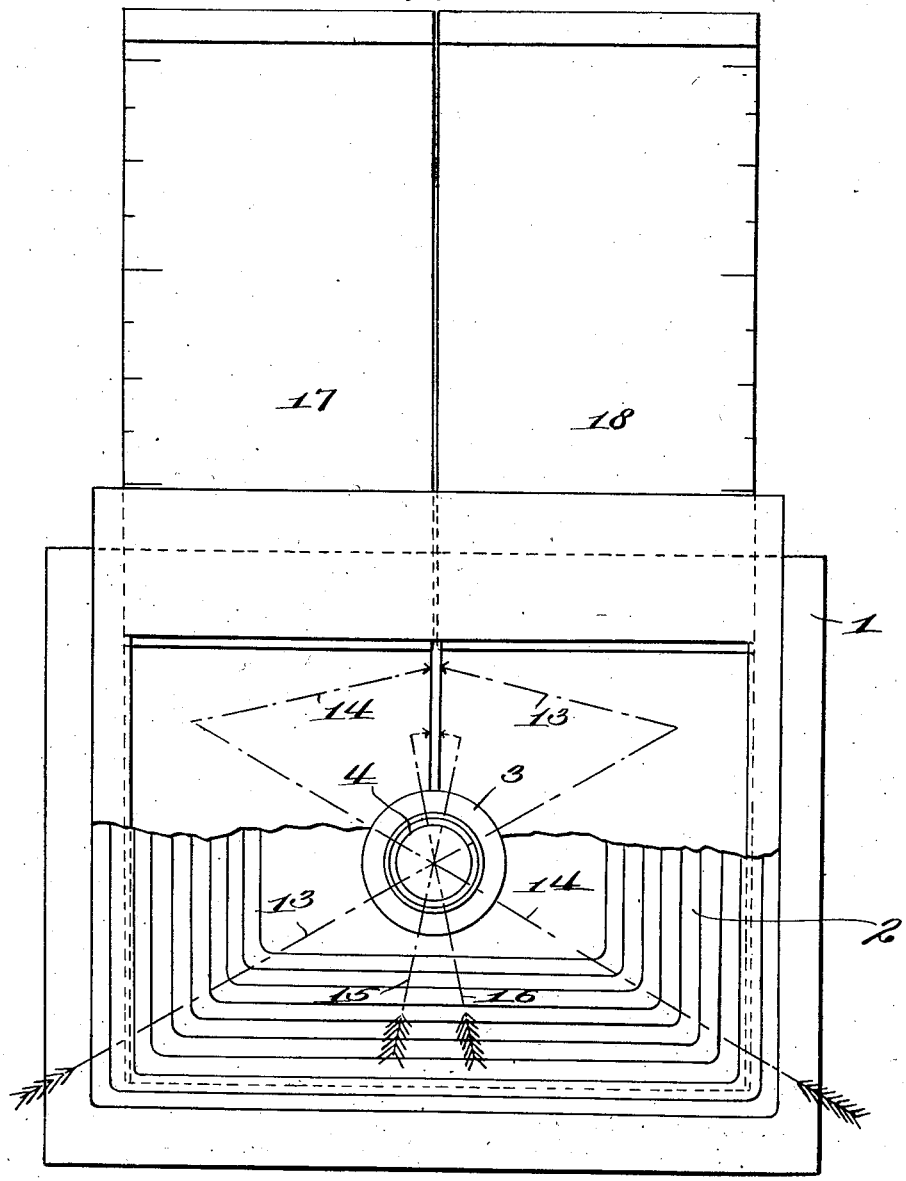

WILLIAM R. SCHWAB, OF KANSAS CITY, MISSOURI, ASSIGNOR TO CAMERAGRAPH CO., OF KANSAS CITY, MISSOURI, A CORPORATION OF ARIZONA TERRITORY.

PHOTOGRAPHIC APPARATUS.

1,003,300.      Specification of Letters Patent.      Patented Sept. 12, 1911.

Application filed March 21, 1911. Serial No. 615,875.

*To all whom it may concern:*

Be it known that I, WILLIAM R. SCHWAB, a citizen of the United States, residing at Kansas City, in the county of Jackson and State of Missouri, have invented new and useful Improvements in Photographic Apparatus, of which the following is a specification.

My present invention relates to improvements in photographic apparatus and more especially to the type adapted for the reproduction of books, records and other documents, and the primary object of the invention is to provide a simple, improved and more efficient apparatus of this type whereby accurate photographic reproductions may be made quickly upon oppositely positioned sensitized surfaces such, for example, as a paper or film sensitized upon both or opposite sides, the exposure of both sensitized surfaces being produced by the use of a single lens which splits an object into two images or projects images of two objects upon the respective sensitized surfaces. In reproducing records or other matter contained in books, the objects upon the two open pages of the book are projected through the lens and are properly cast upon the respective sensitized surfaces by the aid of mirrors or other suitable means for bending or directing the light rays. By using a single lens for the exposure of the two sensitized surfaces, not only is the construction and operation of the apparatus simplified, but more uniform results are obtainable.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 represents a horizontal section of a photographic apparatus constructed in accordance with one embodiment of my invention, this figure showing diagrammatically the manner in which the oppositely placed sensitized surfaces are exposed by the aid of a single lens; and Fig. 2 is a front elevation of the apparatus, the upper portion being broken away to illustrate the interior of the apparatus and to indicate diagrammatically the direction of the light rays as they pass through the lens and are reflected by the mirrors upon the oppositely arranged sensitized surfaces.

Similar parts are designated by the same reference characters in the several views.

Apparatus of various forms may be used in carrying out my invention. In the accompanying drawing I have shown the preferred embodiment of the invention wherein the apparatus is shown as consisting of a suitable casing 1 which is capable of excluding all light except that which enters through the lens 4 during the exposure of the sensitized medium. The front of this casing is open and provided with a bellows 2 and the front of the bellows is closed by a front board 3 which carries a camera lens 4. The optical axis of the lens is preferably in alinement with the longitudinal center of the casing 1 and suitable means is provided within the casing and preferably in alinement with the optical axis of the lens for positioning the sensitized medium or mediums. Preferably the sensitized medium is in the form of a strip of paper or film sensitized on both or opposite sides so that it presents two sensitized surfaces in opposed relation. Such means in the present instance consists of opposed plates of glass or other substantially rigid transparent material 5 having a space between their adjacent faces which forms a passage through which the sensitized medium 6 may pass, the forward edges of the glass plates being connected by a vertical strip 7 of metal or other suitable opaque material which serves as a guide for the forward edge of the sensitized medium and also prevents direct exposure of the sensitized medium by light striking the same edgewise so that the sensitized surfaces are exposed only by the reflected light. The two sensitized surfaces are exposed by light rays which enter the apparatus through the single or common lens 4 and are reflected or otherwise bent to cast images of the objects upon the respective sensitized surfaces. Any suitable means may be provided for reflecting or bending the light rays to accomplish this result, a pair of plane mirrors 8 and 9 being shown in the present instance which are placed at suitable angles and toward opposite sides of the sensitized medium, these mirrors converging toward the rear of the casing. The mirrors or light-reflecting or bending means are placed in such relation and at such angles that the light rays proceeding through the lens from two objects or from two portions of the same object are split or divided and images are cast in proper position and in focus upon the opposed or reversely arranged sensitized surfaces. In the present instance I have shown diagrammatically the manner of photographically reproducing records or other matter from an open book 10. In utilizing the apparatus for such purposes the two open or exposed pages 11 and 12 of the book are treated as separate objects or separate parts of the same object. The lines 13 and 14 designate the outermost rays of light entering the lens from the extreme marginal edges of the open pages while the lines 15 and 16 designate the rays entering the lens from the inner edges of the objects borne by the two open pages of the book. As usual in books containing records, those portions of the pages adjacent to the binding have plain margins which it is unnecessary to reproduce. The light rays just described in passing through the lens of the photographic apparatus cross one another and reverse their relation, that is to say, the rays 13 and 15 which proceed from the right hand page of the book cross one another and also the optical axis of the lens and are reflected or bent by the reflector 9 upon the right hand sensitized surface of the medium 6 when the latter is viewed from the front, while the rays 14 and 16 which proceed from the left hand page of the book cross one another and also the optical axis of the lens and are bent and cast by the reflector 8 upon the left hand sensitized surface of the medium 6 when the latter is viewed from the front. The area between the lines 15 and 16 is not reproduced as this area includes the plain margins of the pages adjacent to the binding of the book or, in other words, is the area of division between the two objects or the two parts of a single object. The sensitized medium 6, the glass plates or other guides 5 which hold the sensitized medium in flat form and precisely in the focal plane of the lens, and the metal or opaque strip 7 at the front of the glass plates 5 are accommodated between the rays represented by the lines 15 and 16. It is to be understood that the relation between the lens, the reflectors or ray-bending means and the sensitized medium or its holding means is such that the two sensitized surfaces are supported precisely in the focal plane of the lens.

Suitable shutters 17 and 18 may be interposed between the lens and the respective reflectors or ray-bending means whereby the sensitized surfaces of the photographic paper or film may be exposed simultaneously, alternately or separately as may be desired. As the rays of light which expose both sensitized surfaces pass through the same lens and the sensitized surfaces are both in the focal plane of the lens, it is obvious that accurate and uniform results are obtained. Any suitable means may be provided for feeding the sensitized medium to and from exposing position and also for developing and fixing the sensitized medium after exposure.

I claim as my invention:—

1. In photographic apparatus, the combination of a lens, means for directing rays from said lens toward one another to a common focal plane, and means for holding a sensitized medium in the focal plane thus established.

2. In photographic apparatus of the class described, the combination of a casing, a lens, means arranged substantially in alinement with the optical axis of said lens for holding a medium having reversely arranged sensitized surfaces, and a pair of angularly placed reflectors arranged to receive portions of the rays from the lens and operative to focus such rays upon the respective sensitized surfaces.

3. In photographic apparatus of the class described, the combination of a casing, a lens, means in the casing for holding a sensitized medium in a plane containing the optical axis of the lens, means arranged to receive rays from the lens and focus them upon said sensitized medium, and means for preventing exposure of the sensitized medium by direct rays from the lens.

4. In photographic apparatus of the class described, the combination of a casing, a lens, opposed transparent plates forming a space between them for the passage of a sensitized medium, a strip of opaque material connecting and protecting those edges of the transparent plates adjacent to the lens, and means arranged to receive rays from the lens and to deflect and focus them upon the sensitized medium.

5. In photographic apparatus of the class described, the combination of a casing, a lens, opposed transparent plates forming a space between them to accommodate a sensitized medium, and means arranged to receive rays from the lens and to focus them upon opposite sides of the sensitized medium.

In testimony whereof I have hereunto set my hand in presence of two subscribing witnesses.

WILLIAM R. SCHWAB.

Witnesses:
  Roy F. Bane,
  Thomas S. Ridge.